UNITED STATES PATENT OFFICE.

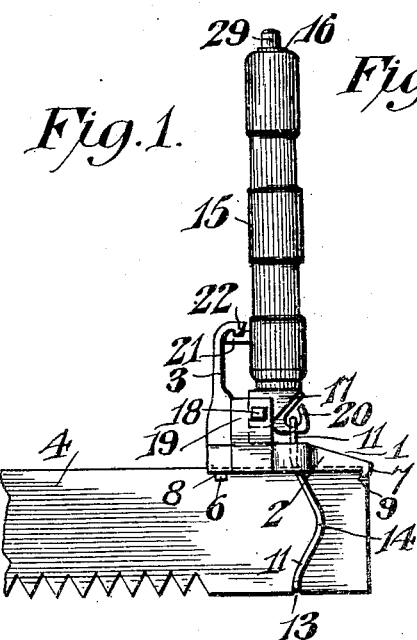
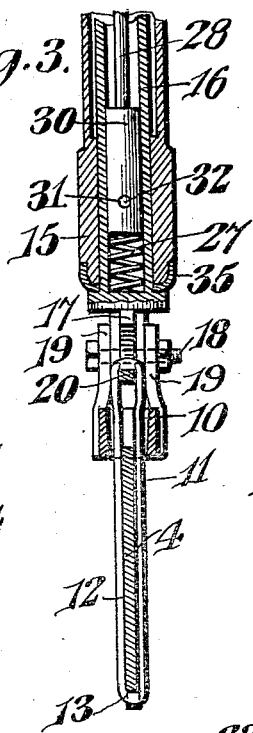
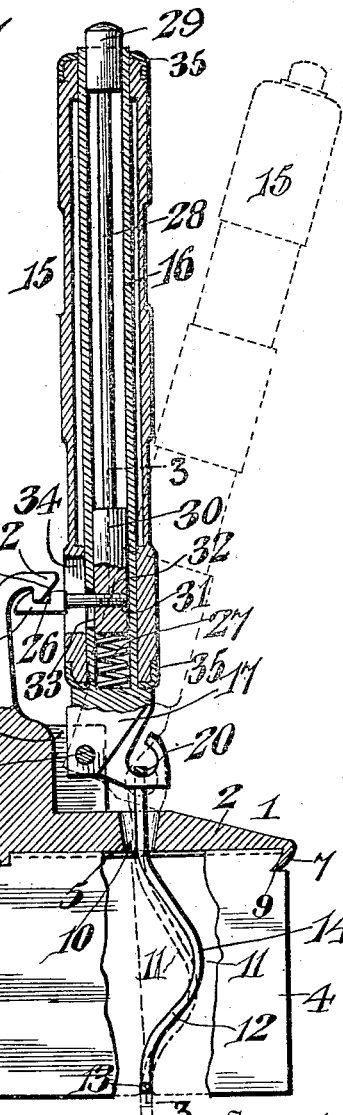
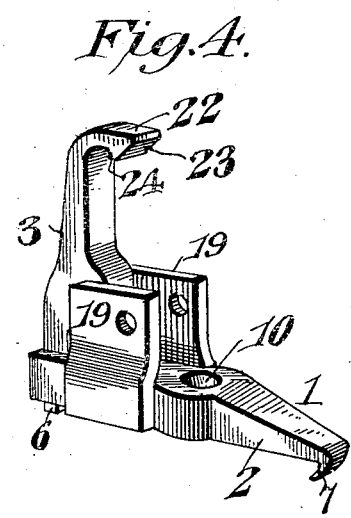
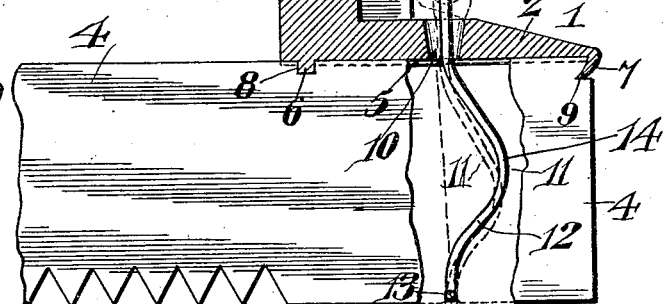

JAMES I. PAULEY, OF ANCHOR, WEST VIRGINIA, ASSIGNOR OF ONE-HALF TO JEFFERSON DUTY, OF RECTOR, WEST VIRGINIA.

SAW-HANDLE.

935,810.  Specification of Letters Patent.  Patented Oct. 5, 1909.

Application filed July 12, 1909. Serial No. 507,108.

*To all whom it may concern:*

Be it known that I, JAMES I. PAULEY, a citizen of the United States, residing at Anchor, in the county of Boone and State of West Virginia, have invented a new and useful Saw-Handle, of which the following is a specification.

The invention relates to improvements in saw handles.

The object of the present invention is to improve the construction of saw handles, and to provide a simple, inexpensive and efficient one of great strength and durability, adapted to be quickly applied to and instantly removed from a saw blade, and capable of firmly gripping the same with a sure strong hold and with a yieldable or spring pressure to maintain the handle tight at all times and also to prevent breakage of the saw blade.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a saw handle, constructed in accordance with this invention and shown applied to a saw blade. Fig. 2 is an enlarged vertical sectional view, taken longitudinally of the saw blade. Fig. 3 is a transverse sectional view on the line 3—3 of Fig. 2. Fig. 4 is a detail perspective view of the relatively fixed saw blade-engaging member.

Like numerals of reference designate corresponding parts in all the figures of the drawing.

1 designates a relatively fixed saw blade-engaging member, constructed of suitable metal and consisting of a horizontally disposed arm or portion 2, and an upstanding arm 3. The horizontal arm 2, which forms the base of the saw blade-engaging member, extends longitudinally of and is set upon the upper edge of a saw blade 4. The said arm 2 is provided in its lower face with a longitudinal saw blade-receiving groove 5, and it has inner and outer saw blade-engaging lugs 6 and 7. The inner lug 6 is rectangular and fits in and engages with a rectangular recess 8 in the upper edge of the saw blade 4, and the outer lug 7, which extends downwardly and inwardly from the outer end of the arm 2, forms a hook-shaped engaging portion, which extends into and engages with a recess 9 of the end of the saw blade. The end recess 9 is located adjacent to the upper edge of the saw blade, and it is tapered to provide an undercut upper wall to engage with the lug 7.

The horizontal arm 2 of the relatively fixed saw blade-engaging member is provided at a point intermediate of its ends with an opening 10 for the passage of a relatively movable saw blade-engaging member 11, consisting of a bowed or bent link of steel, or other suitable material, having a narrow saw blade-receiving opening 12. The link 11 extends downward and engages a lower notch 13, formed in the lower edge of the saw blade and located directly beneath the opening 10. The resilient link is bowed or bent between its ends at 14 and it provides for a yieldable engagement with the saw blade to prevent breakage thereof and also to maintain the saw handle 15 tight at all times. Also it will enable the device to be applied to saw blades of different widths, although in practice the relatively movable saw blade-engaging member will be constructed in different sizes to fit various saw blades.

The handle 15, which is preferably constructed of wood, is hollow and is equipped with an interior tube 16, constructed of suitable material and extending entirely through the hollow handle, and provided at its lower end with a flat head 17, pivoted near its inner edge by a transverse bolt 18 between a pair of spaced ears or flanges 19 of the relatively fixed saw blade-engaging member, and having a laterally reduced outer shaped portion 20 for engaging the upper end of the link 11. The handle constitutes a lever for drawing the saw blade-engaging members tightly against the saw blade, and easy means for the attachment and removal of the device is thereby provided. The flanges 20 are located at opposite sides of the relatively fixed saw blade-engaging member at the angle formed by the arms 2 and 3, and they are formed integral with the said member. The handle is fulcrumed by the transverse bolt 18 on the relatively fixed saw blade-engaging member, and when it is swung inward it causes the saw blade-engaging members to grip the saw blade, and an outward movement of the handle from the position shown in full lines in Fig. 2 of the drawing to the position illustrated in dotted lines releases the saw blade. The hook-shaped engaging portion 20 is formed by an inclined slot, which is enlarged at the lower portion at the inner side of the bill of the hook. The handle is locked in a vertical position by means of a spring actuated catch 21, projecting horizontally from the inner side of the handle and coöperating with a fixed engaging portion 22 of the upstanding arm 3. The upstanding arm 3 has its upper terminal portion bent outward and arranged horizontally, and it is enlarged at the end and beveled to form an inclined front face 23 and an inner vertical shoulder 24. The front end of the catch 21 is beveled to provide an inclined face 25, and it has a recess 26 in rear of the front face to receive the engaging portion or head of the upstanding arm 3. The vertical shoulder 24 of the terminal portion of the upstanding arm engages a vertical shoulder formed by a recess 26, and the two members of the catch are held in engagement with each other by means of a coiled spring 27, arranged within the tube 16 and located beneath the lower end of an operating rod 28. The operating rod 28, which is arranged within the tube 16, is provided with upper and lower cylindrical portions 29 and 30, and the lower cylindrical portion has a threaded opening 31 for the reception of a threaded shank 32 of the catch 21. The shank operates in a slot 33 of the tube 16, and the handle is provided with an opening 34 for this purpose. The spring is located at the lower end of the tube 16, and it yieldably maintains the upper cylindrical portion 29 of the operating rod 28 in a projecting position with relation to the handle. The upper cylindrical portion 29 is rounded, and it constitutes a depressible button or head by means of which the catch 21 is moved out of engagement with the upstanding arm for releasing the saw blade. The catch is adapted to automatically engage with the beveled head of the upstanding arm, when the handle is swung inward to a vertical position. The handle 15, which may be of any preferred construction, is reinforced at its upper and lower ends by suitable ferrules 35.

When the bolt 18 is taken out and the shank of the catch 21 is released from the lower cylindrical portion of the operating rod, the parts of the device may be separated. The link 14 cannot be disengaged from the hook-shaped portion 20 until the parts are separated, as the width or horizontal thickness of the metal at the top of the link is slightly greater than the width of the entrance slot or mouth of the hook, while the vertical thickness of the upper end of the link is slightly less than the width of the mouth of the hook. By swinging the link upward so as to present the side face of the upper end to the mouth of the hook, the link will readily pass therethrough. By this construction, there is no liability of any of the parts of the device becoming lost after they have been assembled.

Having thus fully described my invention, what I claim as new and desire to secure by Letters Patent, is:—

1. A device of the class described including a relatively fixed saw blade-engaging member adapted to be seated upon and engaged with one of the longitudinal edges of a saw blade, a relatively movable saw blade-engaging member arranged to extend across the saw blade and engage the other longitudinal edge thereof, a handle fulcrumed on the relatively fixed member and connected to the relatively movable member and adapted to be oscillated to draw the said members in engagement with a saw blade, and coöperating engaging portions carried by the relatively fixed member and the handle for locking the members in engagement with the saw blade.

2. A device of the class described including a relatively fixed saw blade-engaging member adapted to be seated upon and engaged with one of the longitudinal edges of a saw blade, a relatively movable saw blade-engaging member arranged to extend across the saw blade and engage the other longitudinal edge thereof, a handle fulcrumed on the relatively fixed member and connected to the relatively movable member and adapted to be oscillated to draw the said members in engagement with a saw blade, and a spring actuated catch carried by the handle and arranged to automatically engage the relatively fixed member to lock the two members in engagement with the saw blade.

3. A device of the class described including a relatively fixed saw blade engaging member adapted to be seated upon the upper edge of a saw blade, a link arranged to receive the saw blade, a handle pivoted at its lower end to the relatively fixed member and connected with the link and adapted to be oscillated to draw the relatively fixed member and the link into engagement with the saw blade, and means for locking the handle for holding the member and the link in such engagement.

4. A device of the class described including a relatively fixed saw blade-engaging member adapted to be arranged upon the upper edge of a saw blade, a handle pivoted at its lower end to the said member and arranged to swing inward and outward to and from an upright position, and a relatively movable member provided with means for engaging the lower edge of the saw blade and connected with the handle at the outer side of the pivotal point, whereby the members will be drawn into engagement with the blade when the handle is swung inward, and means for locking the handle to hold the members in engagement with the saw blade.

5. A device of the class described including a relatively fixed saw blade-engaging member adapted to be arranged upon the upper edge of a saw blade, a link arranged to extend across and receive the saw blade to engage the lower edge thereof, an opposite relatively fixed member, a handle fulcrumed on the relatively fixed member and provided with a hook-shaped engaging portion receiving the link, and means for locking the handle to hold the link and the relatively fixed member in engagement with the saw blade.

6. In a device of the class described, the combination with a saw blade having recesses in its upper and lower edges and provided also with an end recess, a relatively fixed saw blade-engaging member seated upon the upper edge of the saw blade and provided with inner and outer lugs, the inner lug being engaged with the upper recess and the outer lug being hook-shaped and engaging the end recess, a link receiving the saw blade and engaging the lower recess, a handle fulcrumed on the relatively fixed member and connected with the link, and means for locking the handle.

7. A device of the class described including a relatively fixed saw blade engaging member adapted to be arranged upon the upper edge of a saw blade, and a resilient bowed link engaging the lower edge of the saw blade, and a handle fulcrumed on the relatively fixed member and connected with the resilient link for drawing the said member and the link into engagement with the saw blade, the resilient link exerting a yieldable pressure on the saw blade.

8. A device of the class described including a relatively fixed saw blade-engaging member adapted to be placed upon a saw blade and provided with a saw blade-receiving groove and having spaced lugs for engaging the saw blade, said member being also provided between the lugs with an opening, a link engaging the lower edge of the saw blade and extending through the opening of the said member, and a handle fulcrumed on the member and connected with the link.

9. A device of the class described comprising a saw blade-engaging member including a base portion adapted to be seated upon the upper edge of a saw blade, and an upstanding arm, a relatively movable member engaging the lower edge of the saw blade, a handle fulcrumed on the relatively fixed member and connected with the other member, and a catch carried by the handle and engaging the upstanding arm.

10. A device of the class described comprising a relatively fixed saw blade-engaging member including a horizontal arm adapted to be seated upon the saw blade, and an upstanding arm arranged at one end of the horizontal arm and provided with a fixed upper engaging portion, a relatively movable member engaging the lower edge of the saw blade, and a handle fulcrumed on the relatively fixed member and connected with the other member and provided with a catch arranged to engage with the engaging portion of the upstanding arm automatically.

11. A device of the class described comprising a relatively fixed member including a base portion, and an upstanding arm having its upper portion extended at an angle and provided with a head, a relatively movable member engaging the lower edge of the saw blade, and a handle fulcrumed on the relatively fixed member and connected with the other member and provided with a spring actuated catch arranged to engage with the head of the upstanding arm automatically.

12. A device of the class described comprising a relatively fixed member adapted to be seated upon a saw blade and having an upstanding arm, a relatively movable member engaging the lower edge of the saw blade, a handle fulcrumed on the relatively fixed member and connected with the other member, a catch mounted on the handle and arranged to engage the upstanding arm, an operating rod located within the handle and connected with the catch and projecting from the upper end of the said handle to provide a depressible portion, and a spring for holding the catch in engagement with the upstanding arm and for maintaining the operating rod in its projecting position.

13. A device of the class described including a relatively fixed member adapted to be seated upon the saw blade and having an opening, a handle pivoted to the said member adjacent to the opening and provided with a hook-shaped engaging portion having a contracted entrance or mouth, and an upright link engaging the lower edge of the saw blade and extending through the opening of the said member and engaged by the said hook-shaped portion, the width of the metal of the upper end of the link being greater than the width of the mouth or entrance of the hook-shaped portion to prevent the disengagement of the link when the latter is in its normal position and the vertical thickness of the metal being less than the width of the mouth or entrance of the hook to permit the removal of the link when the latter is swung upward from its normal position.

In testimony, that I claim the foregoing as my own, I have hereto affixed my signature in the presence of two witnesses.

JAMES I. PAULEY.

Witnesses:
D. B. PAULEY,
FLORA A. MILLER.